United States Patent [19]

Hastwell

[11] 4,382,468

[45] May 10, 1983

[54] FLAT PLATE HEAT EXCHANGER MODULES

[76] Inventor: Peter J. Hastwell, 133 Mills Ter., North Adelaide, Australia, 5006

[21] Appl. No.: 227,088

[22] PCT Filed: May 16, 1980

[86] PCT No.: PCT/AU80/00014

§ 371 Date: Jan. 17, 1981

§ 102(e) Date: Jan. 6, 1981

[87] PCT Pub. No.: WO80/02590

PCT Pub. Date: Nov. 27, 1980

[30] Foreign Application Priority Data

May 17, 1979 [AU] Australia ............................ PD8841

[51] Int. Cl.³ .......................... F28F 3/12; F28F 9/16
[52] U.S. Cl. ................................. 165/173; 29/157.4; 126/448; 165/170; 165/171; 165/174
[58] Field of Search ............... 126/448, 450; 29/157.4; 165/148, 153, 170, 173, 174, 175, 169, 171

[56] References Cited

U.S. PATENT DOCUMENTS

| | | | |
|---|---|---|---|
| 1,805,917 | 5/1931 | Lysholm et al. | 165/175 |
| 2,639,899 | 5/1953 | Young | 165/173 |
| 3,265,126 | 8/1966 | Donaldson | 165/153 X |
| 3,689,972 | 9/1972 | Mosier et al. | 165/175 X |
| 4,031,881 | 6/1977 | Thiel | 165/175 X |
| 4,098,331 | 7/1978 | Ford et al. | 165/170 |
| 4,292,958 | 10/1981 | Lee | 165/175 X |
| 4,309,987 | 1/1982 | Higgins, Jr. | 165/175 X |

FOREIGN PATENT DOCUMENTS

| | | | |
|---|---|---|---|
| 2336247 | 2/1975 | Fed. Rep. of Germany | 165/173 |
| 641266 | 1/1979 | U.S.S.R. | 165/173 |

*Primary Examiner*—Sheldon J. Richter
*Attorney, Agent, or Firm*—Pearne, Gordon, Sessions, McCoy, Granger & Tilberry

[57] ABSTRACT

A heat exchanger module, such as a solar collector module, comprising a tube sheet (3) connected to a header (4). The tube sheet (3) passes through an opening in the header (4) so that the end of the sheet (5) protrudes a distance into the header (4), the header opening being united to the surface of the tube sheet (3) so that the tendency of the tube sheet (3) to burst or split open in the region of the junction of the tube sheet and header is minimized when the module is under fluid pressure. By the term "tube sheet" is meant a substantially planar sheet having an upper and a lower plastic membrane interconnected by a series of spaced division walls thereby forming a series of tubes arranged generally in a flat plane across the sheet, the tubes being continuous through the sheet and open at the two opposite ends of the sheet. The term also includes a sheet of circular tubes joined in side-by-side relationship.

6 Claims, 11 Drawing Figures

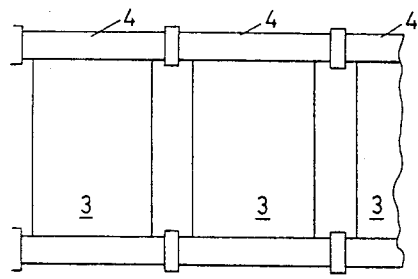
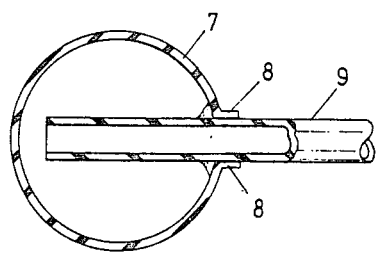
FIG. 5
FIG. 6
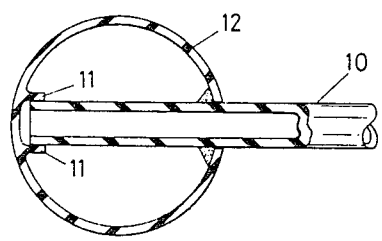
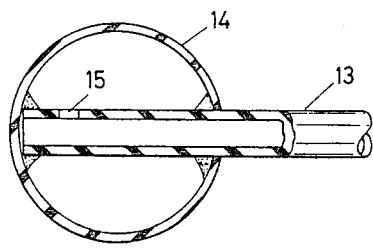
FIG. 7
FIG. 8
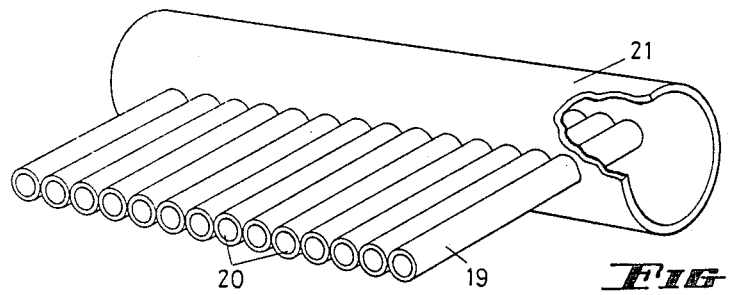
FIG. 9
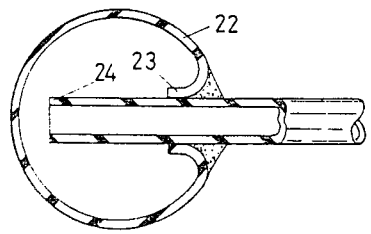
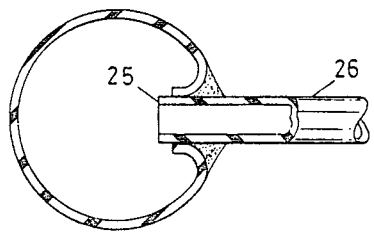
FIG. 10
FIG. 11

FLAT PLATE HEAT EXCHANGER MODULES

This invention relates to improvements in and to flat plate heat exchanger modules and it relates particularly to the attachment of headers to tube sheets in solar collector panels.

BACKGROUND OF THE INVENTION

It is customary in solar heaters and similar devices to use a series of tubes through which a fluid which is to be heated is caused to flow and to interconnect these tubes by means of headers at each end so that a common supply of fluid can be fed to the tubes and after heating can be received from the tubes.

Various forms of construction of such units can be used but it is known to form the tubes through which the fluid flows by extruding plastic materials to produce a unitary cross-section to form what is known as a tube sheet which has a series of tubes placed side by side and generally formed by having an upper wall and a lower wall spaced apart by a plurality of spaced walls to divide the space between the upper and lower walls into a plurality of tubes longitudinally arranged along the unit one form of such is shown in Australian Pat. No. 494,721.

The invention relates generally to a module in which a series of tubes are formed in a single planar element and has a header attached to it at each end to allow fluid which is to pass through the tubes to be fed to the open tubes at one end and to leave the open tubes at the other end, so that one header acts as a supply header and the other as a receiving header for the fluids.

In such a module, a considerable problem exists in joining such headers to the tube sheet which as said contains a series of side-by-side tubes, and it is found in practice that if a header is formed of a plastic material and is joined to the ends of the tube sheet that, when pressure fluid is applied to the system, fracture will occur at the junction between the header and the tube sheet which generally is due to fracturing of the walls of the tube sheet itself at the junction, and consequent failure of the header.

An object of the present invention therefore is to so construct a junction between headers and a tube sheet to minimise the fracture of either the tube sheet or the header.

The term "tube sheet" is intended herein to refer to a substantially planar sheet having an upper and a lower plastic membrane interconnected by a series of spaced division walls which then form a module in which the series of tubes are arranged generally in a flat plane across the module which tubes are continuous through the module and open at the two opposite ends of the module. It is also intended to include a sheet of circular tubes joined in side-by-side relationship.

A further object of the invention is to control the flow of fluid through the tubes of the module because there is normally a tendency in headers which connect such tubes to have a greater flow at some areas, depending on the pressures fluid flow rates, and fluid entrainment effects existing in the headers.

Other objects will be apparent from the following description which is made with reference to specific forms of the invention but it is to be appreciated the invention is not necessarily limited to the forms described.

SUMMARY OF THE INVENTION

In a broad form of the invention, there is provided a solar collector module comprising a tube sheet connected at each end to a tubular header, characterised in that the end of the tube sheet is joined to the header such that the end of the tube sheet has its outer surface subject to the fluid pressure in the header to minimize the opening pressure applied by the header to the outer surfaces of the tube sheet.

According to a preferred form of this invention the tube sheet module is fitted to a header which extends transversally across the module and which encircles the end portion of the module with the header secured to the module some distance in from its end, whereby the open ends of the tubes in the sheet module are disposed towards the opposite part of the header to the attachment point of the header to the sheet module.

BRIEF DESCRIPTION OF THE DRAWINGS

FIG. 5 shows a bank of panels, FIGS. 6 to 8 show further alternatives in cross-section, FIG. 9 shows the invention applied to a tube sheet formed of a plurality of circular tubes, FIG. 10 shows a further preferred form of the invention, and FIG. 11 shows a still further form of the invention.

DESCRIPTION OF THE PREFERRED EMBODIMENT

In explanation of the invention it can be stated that, according to the known art, when pressure is applied to the panel, the pressure within the header 2 produces a stress, called a hoop stress, in the header which tends to open up the header. This is resisted by the tube sheet 1, and as shown, the tube sheet 1 also has applied to it an internal pressure which produces a stress in the walls of the tube sheet 1. The stress in the tube sheet is carried by the walls of the tube sheet, and at the point of entry of the tube sheet to the header, the walls of the tube sheet must additionally carry the hoop stress of the header. This is the reason why previously used junctions have been unsatisfactory because these stresses are concentrated on the walls of the tubular sheet at the junction with the header 2 so that bursting occurred at this junction, whereas in the present invention the header is attached to a part of the tube sheet better able to resist the pressure of the fluid and the outward pressure loading of the header at the header-tube sheet junction, due to the greater area of walls of the tube sheet resisting these stresses.

Figure 1:
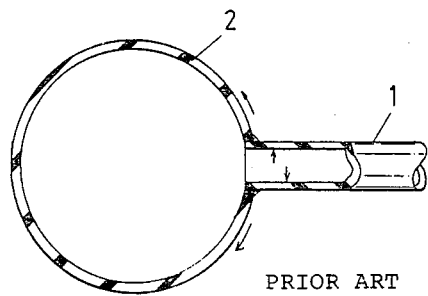
FIGS. 1 and 2 show examples of the known art.
Figure 2:
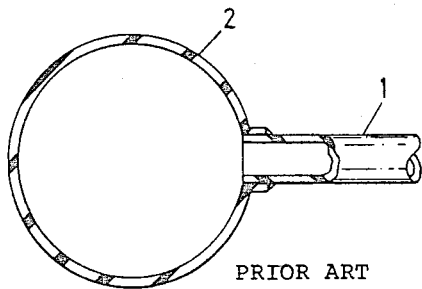

As shown in FIG. 2 the header 2 is known to be provided with outwardly extending flanges engaging the outer surface of the tube sheet 1, but again the sheet 1 split and burst under pressure, this bursting occurring at the end of the tube sheet when it is joined to the header.

Figure 3:
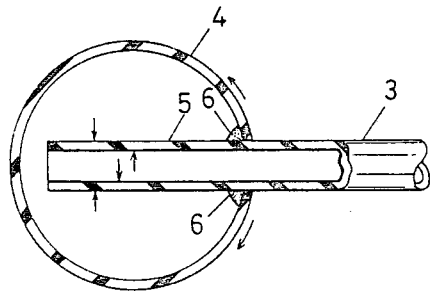
FIG. 3 shows one form of the present invention in cross-section.

When however according to one form of the invention as shown in FIG. 3 the tube sheet 3 is allowed to project into the header 4, pressure on the outside of the tube sheet end 5 in the header is equal to the pressure inside of the tube sheet when a fluid is pressurized in the header, so that any bursting forces exerted within the tube sheet at the end of the tube sheet are countered by the pressure on outside of the tube sheet which is now situated well within the header. As stated, the bursting tendency has been found to be greater when the junction is at the end of the tube sheet than further along the tube sheet so that when the header is joined at a point remote from the end of the tube sheet the same bursting problems do not occur. The header 4 is joined to the tube sheet 3 by suitable adhesive, welding, or the like, both the header and tube sheet being formed of a suitable plastics material. The adhesive 6 is applied to the inside of the header on both sides of the tube sheet.

A further advantage is that by positioning the end of the tube sheet near the remote wall of the header, the flow into the tube sheet can be controlled by proximity effects and it will be realised that this gives a much better form of control of flow into the tubes because the main flow takes place in the header around the end part of the tube sheet to give the aforesaid equalizing pressures at the end of the module and also by proximity effects to control the flow into the tubes of the module.

When high rates of flow of water are used, for example when the solar module is used for heating the water of swimming pools if the tubes do not project into the header a substantial distance, there is a tendency for the flow of water past the tube ends to draw or entrain the water from the tube, this in certain applications giving a reduced or even reverse flow. The present invention overcomes this problem.

Figure 4:
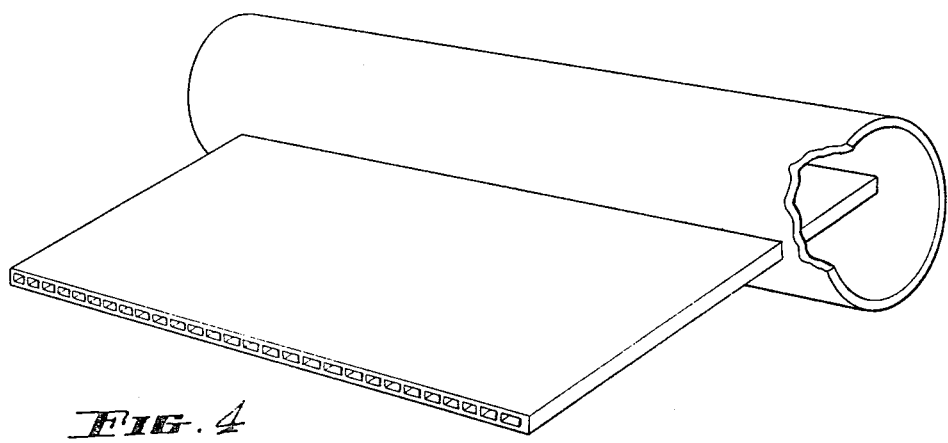
FIG. 4 shows a form similar to FIG. 3 in perspective portion being broken away for clarity.

It will be realised that by appropriately shaping the end of the module or the header that variation in the flow along a bank of panels having headers 4 and tube sheets 3 is controllable so far as flow into the tubes is concerned and this results in a substantial advantage in the flow control in a tube sheet 3. FIG. 4 shows a perspective part cut away of one panel, and FIG. 5 shows a bank of panels.

The same applies at the other end where there is an out-flow of fluid from the tubes into the header and by proximity effects again a control is achieved which can regulate the out-flow from the tubes at any particular position along the headers of a bank of panels.

FIG. 6 shows a further alternative where the header 7 has the edges of the opening formed with lips or flanges 8 to engage the tube sheet 9, suitable adhesive again being applied to the inside of the header 7.

As shown in FIG. 7 the tube sheet 10 is located in a pair of parallel ribs 11 formed in the remote end wall of the header 12. This gives additional support of the end of the tube sheet 10 to locate and apply a resistance to any tendency of the tube sheet to split open and also the clearance can give flow control.

It is possible also, according to a variation as shown in FIG. 8, to bond the end of the tube sheet 13 to the inner wall of the header 14 opposite to the point of entry of the tube sheet 13 into the header, and to provide apertures 15 into the tubes at appropriate locations within the header to allow the in-flow and out-flow of fluids to and from the tubes. Such a construction adds greatly to the strength of the unit by very firmly locating the header on the end of the tube sheet as it is then attached at two diametrically opposite parts of the header, namely at the end of the tube sheet and at the point where the tube sheet passes through a gap between the header edges where the header is attached to the tube sheet remote from the end of the tube sheet.

Alternatively instead of attaching the end of the tube sheet to the header along its length the ends of the tube sheet can be attached to the header but leaving gaps for flow to take place into the tubes in the areas between such ends.

As shown in FIG. 9, the invention is also applied to a second form of tube sheet 19 which is formed of a plurality of circular tubes 20 joined at their abutting edges, the tube sheet 19 also protruding into the header 21.

In FIG. 10 the header 22 is made from an extruded section, preferably round but is shaped with re-entrant edge opening 23, the header of plastics material being thermoformed into this shape. This gives a greater area of sealing to the tube sheet 24, and allows the tube sheet to be fixed to the header from the outside, by means of the application of a suitable adhesive.

FIG. 10 shows the end 24 of the tube sheet 12 extending to be adjacent the opposite wall of the header 22.

However as shown in FIG. 11 the end 25 of the tube sheet 26 is adjacent the inturned lip of the opening, this then applying sufficient restraining force to counteract the hoop stress, with the internal fluid pressure in the header acting to assist in maintaining the inturned lips adjacent the surface of the tube sheet 26.

The methods of bonding can of course vary greatly but generally it is a simple matter to have an effective join by simply running a bonding compound along the junction between the header and the tube sheet and it will be realised for instance that such a tube sheet can be extruded to have one wall of it transparent and the other wall of a black material, or the other wall can otherwise be formed to make it into a heat absorber. The headers are fixed to each end of this tube sheet and these headers can themselves be tubes slotted to allow the ends of the tube sheet to project into the header a sufficient distance to achieve the required pressure equalizing and flow control. Bonding compound can be positioned along the inside or outside of the header where it joins the tube sheet to seal the header firmly to the tube sheet. The tube can be deformed either inwardly or outwardly where it joins the tube sheet to give a greater area where bonding can take place.

From the foregoing it will be realised that a simple and effective form of unit is achieved which will minimise the bursting problems at the junction of the tube sheet and the header previously existing in this type of structure by substantially spreading the hoop stresses of the header over a greater supporting area of material to thereby greatly enhance the strength of the structure.

While the invention has been particularly directed to a solar panel, it is to be realised that the invention is applicable to any heat exchange panel made of any suitable plastics material.

I claim:

1. A heat exchange panel comprising a tube sheet connected at each end to a tubular header, characterised in that at least one end of the tube sheet extends into the header through a longitudinal opening such that the internally projecting end of the tube sheet resists the hoop stress in the header created by the application of fluid pressure in the header, further characterised in that said header is a tubular member with a longitudinal slot, and said tube sheet end passes through said slot to have its end situated within the header remote from the said slot, and sealing means sealing the slot edges to the surfaces of the tube sheet.

2. A heat exchange panel as defined in claim 1 wherein said tube sheet comprises a plurality of tubes, each having a tube diameter substantially equal to the circumferential width of said slot, said tube diameter being substantially less than the diameter of said tubular member and said sheet tube extending into said tubular member a distance at least equal to about twice the tube diameter.

3. A heat exchange panel as defined in claim 1, characterised in that said tube sheet extends across said header to be adjacent the opposite wall of said header.

4. A heat exchange panel as defined in claim 3 characterised in that said tube sheet end is situated adjacent said opposite wall such that the clearance therebetween regulates the fluid flow.

5. A heat exchange panel as defined in claim 1, characterised in that said tube sheet comprises a plurality of tubes joined at their abutting edges to form a sheet.

6. A heat exchanger panel as defined in claim 1, wherein said tube sheet and said header are plastic, said tube sheet providing a plurality of tubes separated by a plurality of walls extending substantially perpendicular to said tubes, said tube sheet and said walls thereof extending at least about halfway into said header and operating to provide a plurality of connections extending across said opening at locations spaced at substantially uniform intervals along the entire length of said opening, and providing a connection between said edges resisting hoop stresses in said header, said hoop stresses being applied to each of said walls at locations spaced from the ends of said walls, said ends of said walls within said header are not subjected to substantial hoop stresses.

* * * * *